(12) United States Patent
Hadley et al.

(10) Patent No.: US 9,507,908 B2
(45) Date of Patent: Nov. 29, 2016

(54) SYSTEMS AND METHODS FOR AIRPLANE ELECTRICAL SYSTEM CONNECTION ROUTING AND VISUALIZATION WITH TOPOLOGY DETERMINATION

(75) Inventors: Brent Louis Hadley, Kent, WA (US); Patrick J. Eames, Newcastle, WA (US); Michael Patrick Sciarra, Seattle, WA (US)

(73) Assignee: The Boeing Company, Chicago, IL (US)

( * ) Notice: Subject to any disclaimer, the term of this patent is extended or adjusted under 35 U.S.C. 154(b) by 707 days.

(21) Appl. No.: 13/093,481

(22) Filed: Apr. 25, 2011

(65) Prior Publication Data
US 2012/0271596 A1    Oct. 25, 2012

(51) Int. Cl.
*G06F 17/50* (2006.01)

(52) U.S. Cl.
CPC ....... *G06F 17/5095* (2013.01); *G06F 2217/36* (2013.01); *G06F 2217/74* (2013.01)

(58) Field of Classification Search
CPC .............. G06F 17/50; G06F 17/5004; G06F 17/5086; B64F 5/00
USPC .......................................................... 703/1
See application file for complete search history.

(56) References Cited

U.S. PATENT DOCUMENTS

| | | | |
|---|---|---|---|
| 6,842,173 B2 * | 1/2005 | Sakakura et al. ............. 345/419 |
| 6,867,768 B2 * | 3/2005 | Sakakura et al. ............. 345/419 |
| 7,082,590 B2 * | 7/2006 | Kragh et al. .................. 716/129 |
| 7,725,846 B2 * | 5/2010 | Yvon et al. .................... 716/103 |
| 8,005,650 B2 * | 8/2011 | Flores et al. ...................... 703/1 |
| 8,131,392 B2 * | 3/2012 | Kersavage et al. ............. 700/97 |
| 8,274,511 B2 * | 9/2012 | Sato .............................. 345/420 |
| 2003/0023947 A1 | 1/2003 | Sakakura et al. |
| 2005/0240383 A1 | 10/2005 | Hashima et al. |
| 2009/0222121 A1 * | 9/2009 | Flores et al. .................... 700/98 |
| 2010/0146466 A1 | 6/2010 | Hadley et al. |
| 2010/0235157 A1 * | 9/2010 | Vedula et al. ................. 703/13 |

OTHER PUBLICATIONS

International Search Report and Written Opinion of PCT/US2012/035047; 12 pages.
Wakely, C. John et al.; Vehicle Wiring Harness Design and Manufacture; Technical Papers International Conference: CAD-CAM CAE Integration Technologies in the Automotive Industry; Jan. 1988; pp. 445-464.
Van Der Velden, C. et al.; An Intelligent System for Automatic Layout Routing in Aerospace Design; Innovations in Systems and Software Engineering; A NASA Journal; May 8, 2007; pp. 117-128; vol. 3, No. 2; Berlin, Germany.
Office Action of U.S. Appl. No. 12/331,216 dated May 11, 2011; 9 pages.
U.S. Appl. No. 12/712,160, filed Feb. 24, 2010.
EPO Examination Report for related application 12721987.1 dated Jun. 1, 2016; 6 pp.

* cited by examiner

*Primary Examiner* — Aniss Chad
(74) *Attorney, Agent, or Firm* — Armstrong Teasdale LLP

(57) ABSTRACT

A method for creating a computerized visualization of a wiring topology is described that includes combining three-dimensional wire harness data with logical wire content using a process executed on a computer processing device, and displaying a graphical wire topology, output from the process, within a three dimensional model of the platform within which the wiring topology is contained.

18 Claims, 21 Drawing Sheets

| X676Z802002-6.1>676...\Solid.1 | | | | | | | |
|---|---|---|---|---|---|---|---|
| Status | Bundle | HEI | Wire | Part Number | Gauge | Color | Fi |
| Traced | 802002 | 668Z802002-7 -B | 20035R | BMS13-60T50C0... | 22 | | D |
| Traced | 802002 | 668Z802002-7 -B | 20035B | BMS13-60T50C0... | 22 | | D |
| Traced | 802002 | 668Z802002-7 -B | 20035Z | | | | D |
| Traced | 802002 | 668Z802002-7 -B | 20037B | BMS13-60T50C0... | 22 | | D |
| Traced | 802002 | 668Z802002-7 -B | 2003Z | | | | D |
| Traced | 802002 | 668Z802002-7 -B | 20038B | BMS13-60T50C0... | 22 | | D |
| Traced | 802002 | 668Z802002-7 -B | 00013 | BMS13-60T50C0... | 20 | | D |

| Status | Wire | Bundle | Part Number | Gauge |
|---|---|---|---|---|
| Not Traced | 10159 | 101414 | | |
| Not Traced | 10044 | 402014 | | |
| Not Traced | 12037 | 401234 | | |
| Not Traced | 10159Z | 101414 | | |

SYSTEMS AND METHODS FOR AIRPLANE ELECTRICAL SYSTEM CONNECTION ROUTING AND VISUALIZATION WITH TOPOLOGY DETERMINATION

BACKGROUND

The field of the disclosure relates generally to wiring system design and documentation, and more specifically, to systems and methods for airplane electrical system connection routing and visualization with topology determination.

Certain traditional manufacturing enterprises are moving their business model to that of a large-scale systems integrator. As such, there is a need for systems and methods that verify wiring system designs developed by suppliers. As an example, aircraft wiring systems present unique challenges in terms of scale, spatial requirements, and the number of interfaces. For a typical aircraft, the wiring system design definition is scattered across multiple product data managers (PDMS).

One problem with such an arrangement is that system designers need to be able to visualize the physical design as represented by three-dimensional geometric data and any related non-geometric data in order to verify and validate wiring systems configurations. Currently, this problem is addressed using physical mockups (which are sometimes referred to as an iron-bird), prototype construction, and paper engineering requirements and/or drawings. These solutions are labor intensive and consume many man hours that could be better applied elsewhere.

The three-dimensional wire harness models on one known aircraft program include wire harness installation (WHI) models and wire harness assembly (WHA) models. The WHI and WHA models contain geometric harness data but do not contain logical wire content. Instead it is a harness end item (HEI) that includes the logical wire content for the harnesses. Because these three model types are separate, it is difficult to determine the wire routes in the three-dimensional space of the airplane. It is believed that no complete three-dimensional wiring topology for airplanes or other complex platforms has ever been created. More specifically, no precise three dimensional description that is both graphically represented and textually representative of each individual wire detail such as size, type, material, gauge, signal, and amperage has been completely described. Instead, as described above, a complete physical mockup of the wiring systems was created and installation drawings were created to substitute for the wiring topology on the platform.

BRIEF DESCRIPTION

In one aspect, a method for creating a computerized visualization of a wiring topology is provided. The method includes combining three-dimensional wire harness data with logical wire content using a process executed on a computer processing device, and displaying a graphical wire topology, output from the process, within a three dimensional model of the platform within which the wiring topology is contained.

In another aspect, one or more computer-readable storage media having computer-executable instructions embodied thereon are provided. When executed by at least one processor, the computer-executable instructions cause the at least one processor to select a connection between modules in a platform, determine applicable logical wire content for the selected connection, load the applicable three-dimensional wire harness data for the logical wire content, filter the three-dimensional wire harness data by harness and by connective equipment, and trace each wire segment in the connection, and provide the results to a user interface.

In still another aspect, a system for routing and visualization of a wiring topology is provided. The system includes a processing device, a memory communicatively coupled to the processing device, and a user interface communicatively coupled to the processing device. The system is programmed to receive, via the user interface, a user selection of a wire within a wiring topology, load, from the memory, a three-dimensional model and a wire harness installation list for a selected wire, bundle data related to the selected wire using logical, physical, and three-dimensional point data from both the three-dimensional model and the wire harness installation list, produce a list of wire harness installation segments, trace the selected wire through the wire harness installation segments to define a wire route for the selected wire, and provide an output via the user interface predicting three-dimensional routing of the selected wire through a platform.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 15 illustrates a window providing logical data related to a selected model.

FIG. 20 illustrates user selection of a net column to sort table data by net.

DETAILED DESCRIPTION

Figure 1:
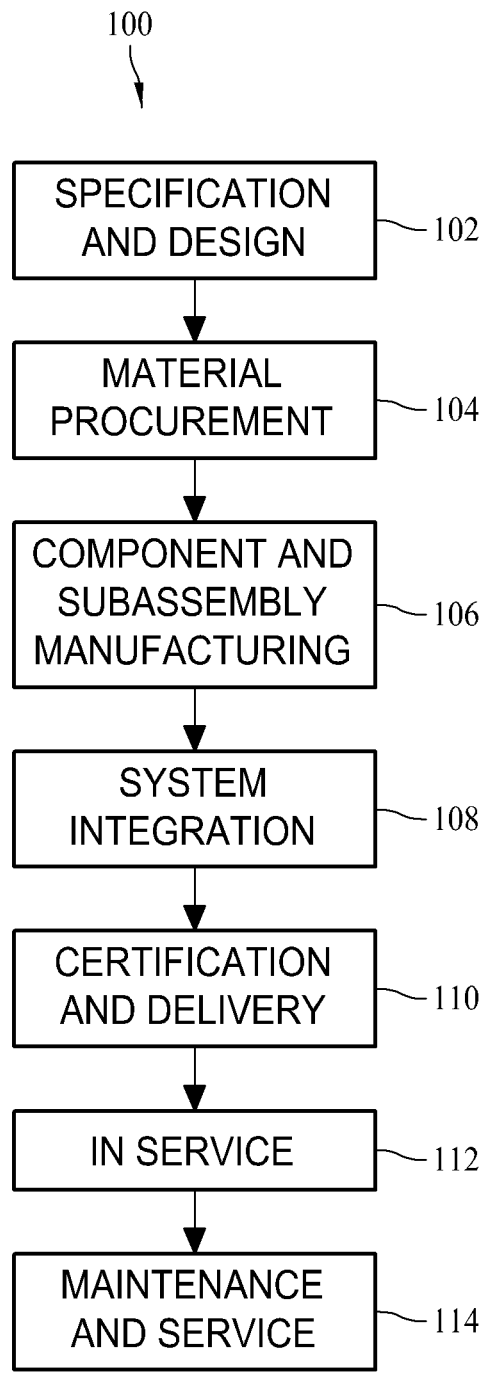
FIG. 1 is a flow diagram of an aircraft production and service methodology.

The embodiments described herein relating to connection routing visualization (CRV) allow wire designers, wire installers, and the like to view logical and physical design connection routes in a three-dimensional view. While described in terms of an airplane, the embodiments should not be construed to be so limited. The described CRV tool also provides visibility of the logical and physical design wire content for each three-dimensional wire harness model segment. A key element of the CRV system and method is an ability to reverse engineer the complete wiring topology (physical routing and layout) of the network and wiring system on a platform, such as an airplane. Further, in the airplane context, the described CRV embodiments are useable to create a virtual 'iron-bird' for a designed airplane. The reverse engineered wiring topology created by the disclosed processes are unique, for example, to the airplane model, based on the design. In addition the resulting wiring topology represents 'uniquely' each airplane in the as-designed and as-built condition. Such a topology allows for all rework, modifications, configuration changes, and customer alterations. In summary, from this topology every information descriptor about the wiring system is known, even if the system is as simple as a single wire or as complex as a federated network on a shared network cable.

As used herein, a wiring topology refers to a precise three-dimensional detailed description (both graphically represented and textually represented) of each individual wire, including, but not limited to, size, type, material, gauge, signal, and amperage. The described embodiments are directed to the combining of wiring geographic spatial topology, physical layout topology, and logical connection topology to completely and exactly describe each wire.

The CRV tool is used as an aid, for example, by an electrical design group to verify design requirements where knowledge of three-dimensional wire routing information is critical by creating, in the airplane context, a tail number specific dataset of the routes, layout, and installation of each and every wire, plug, and pin in the airplane. While described in the context of electrical routing and wire harnesses, it should be understood that the embodiments may be applied to systems such as pneumatic, air, and hydraulic, which in complex systems are difficult to visualize.

The life cycle of a design starts with functional requirements, progresses to logical design requirements, and eventually results in a physical design. One way to envision these requirements is to consider the logical design as a schematic and the physical design as a three dimensional implementation of the schematic and may include data associated with a wire system function, layout, location and implementation. It is important for entities developing designs of such complexity to verify that the logical design and the physical design are in sync. However, such verification is difficult if the various design data are in separate places.

The following is one example. In a logical design, the individual wires are inside a wire harness. The described embodiments are operable to trace each individual wire to make sure that the wire harness routing is complete, and verify the contents of the physical design. Specifically, physical placement of the individual wires of the wiring harness is verified to ensure that any physical separation requirements between individual wires are met. In addition, the physical confines of the area the wires are to be placed are verified to ensure that the "real estate" needed to place that portion of the wiring harness is provided. As an example, certain signals may need to be redundant, and therefore are routed on both the left and right side of an airplane.

More specifically, the systems and methods described herein integrate logical design data, two-dimensional schematic, and three-dimensional geometric data to allow visualization of the data and enhance systems and wire integration logical data with three-dimensional physical design information. In at least one embodiment, common data in the wiring system's logical data and physical data are combined to allow a user to visualize systems signal routing, wire segment routing, and highlighting a wire harness assembly within one or many wire harness installations.

Figure 2:
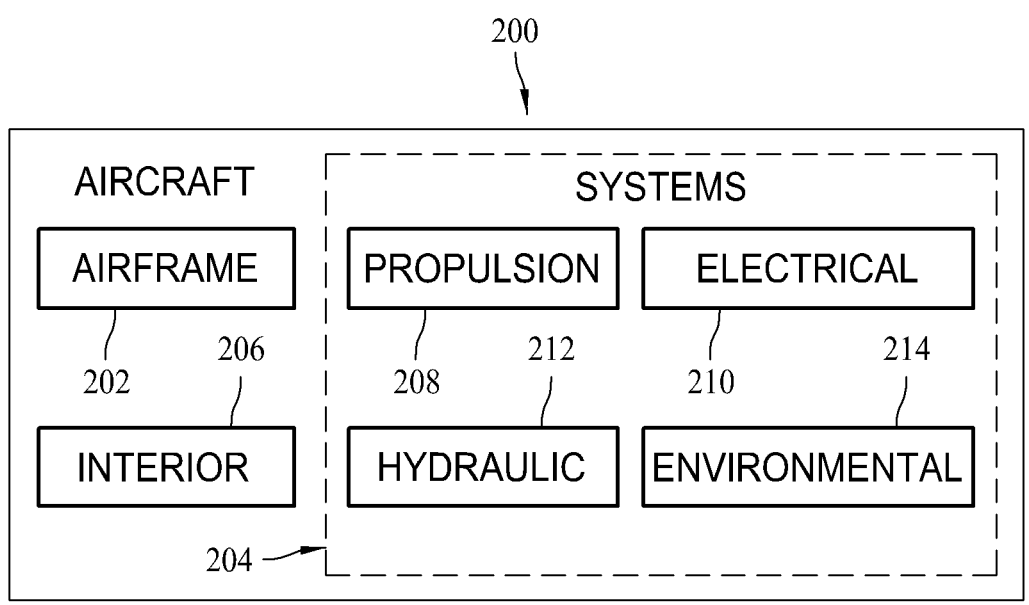
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
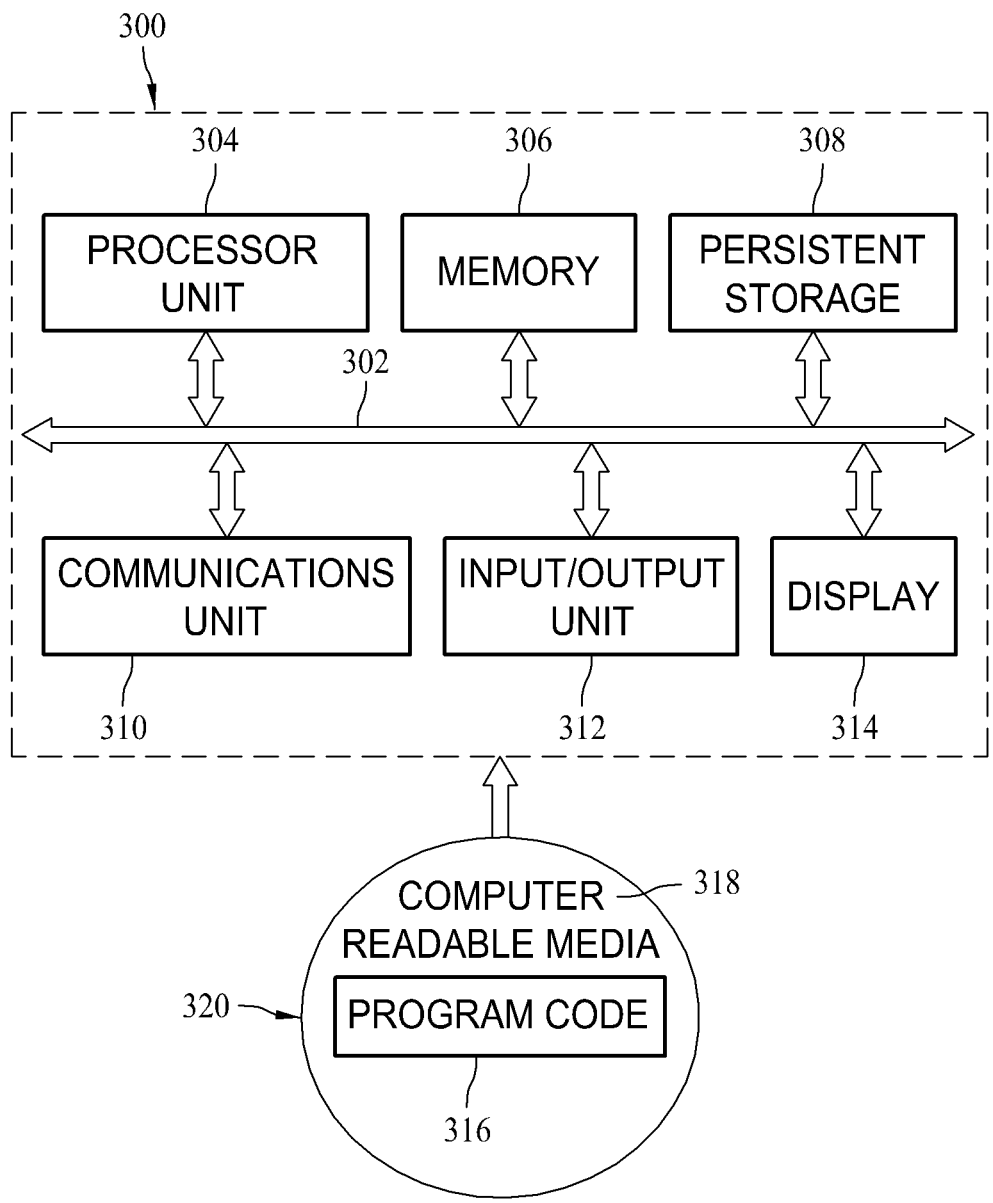
FIG. 3 is a diagram of a data processing system.

Turning now to FIG. 3, a diagram of a data processing system 300 operable for executing the CRV embodiments described herein is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314. It should be understood that the example of FIG. 3 is simply one example of an architecture capable of executing the described embodiments.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described system is operable to recreate a wiring topology using graph search techniques when combining logical design and notional three-dimensional physical design data. Additional secondary features include routing visualization, signal tracing, and segment content viewing. In addition, the CRV system suggests and advises a user in regard to routing information when new designs are proposed and/or developed.

Figure 4:
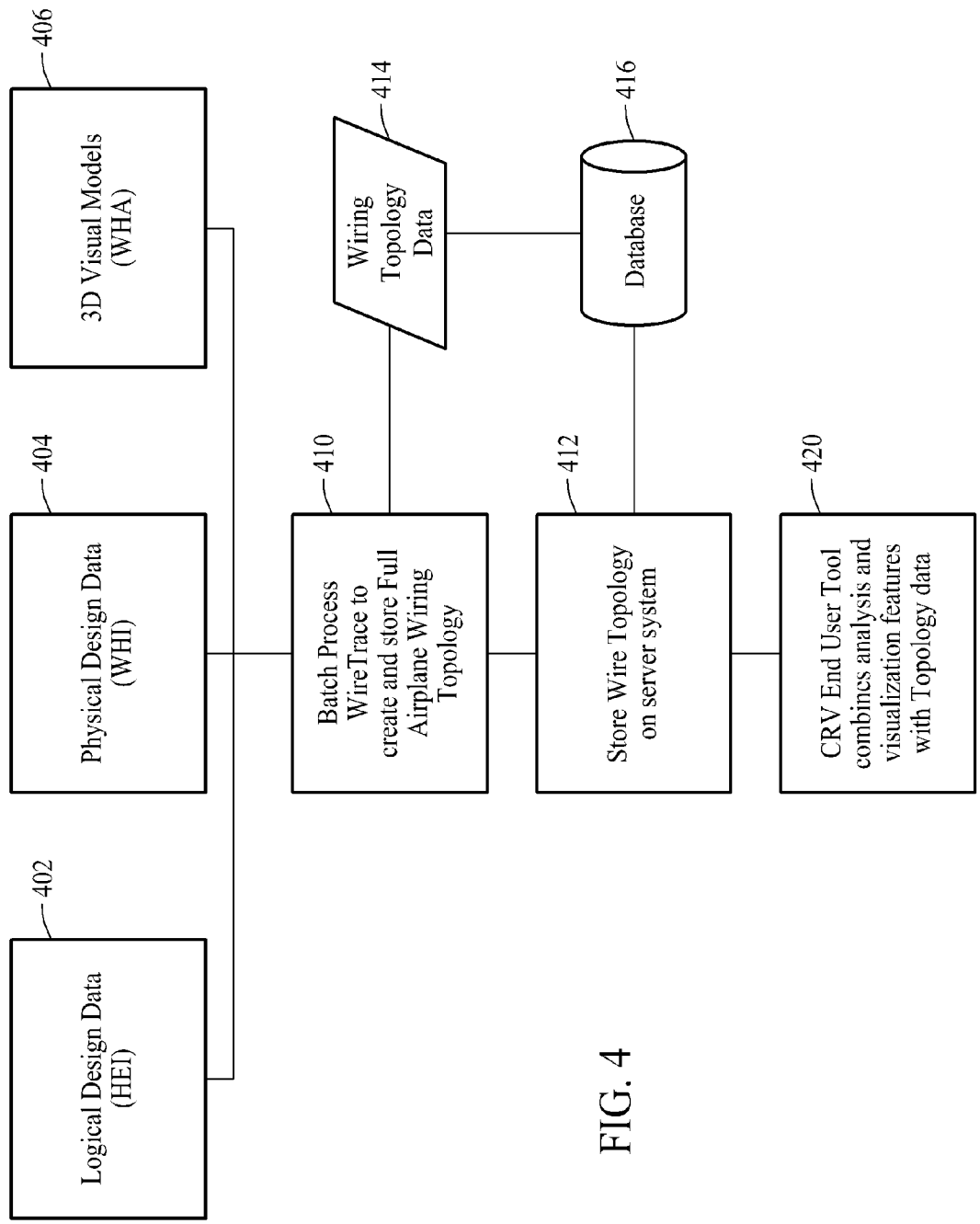
FIG. 4 is a flow diagram illustrating combination of logical design data, physical design data, and three-dimensional visual models in a batch process or other process executed on a processing device.

Referring to FIG. 4, logical design data 402, physical design data 404, and three-dimensional visual models 406 are combined in a batch process or other process executed on a processing device 410 to create a full wiring topology which is stored on a server system 412. The process results in wiring topology data 414 which is maintained within data base 416. The end user tool 420, referred to herein as CRV, combines analysis and visualization features with topology data. The result is both an ability to trace wires (sometimes referred to as net segments) or connections (net family) within the three-dimensional wiring geometry and an ability to select a segment within the three-dimensional wiring geometry and display the wire connect (which wires) route through the segment.

Figure 5:
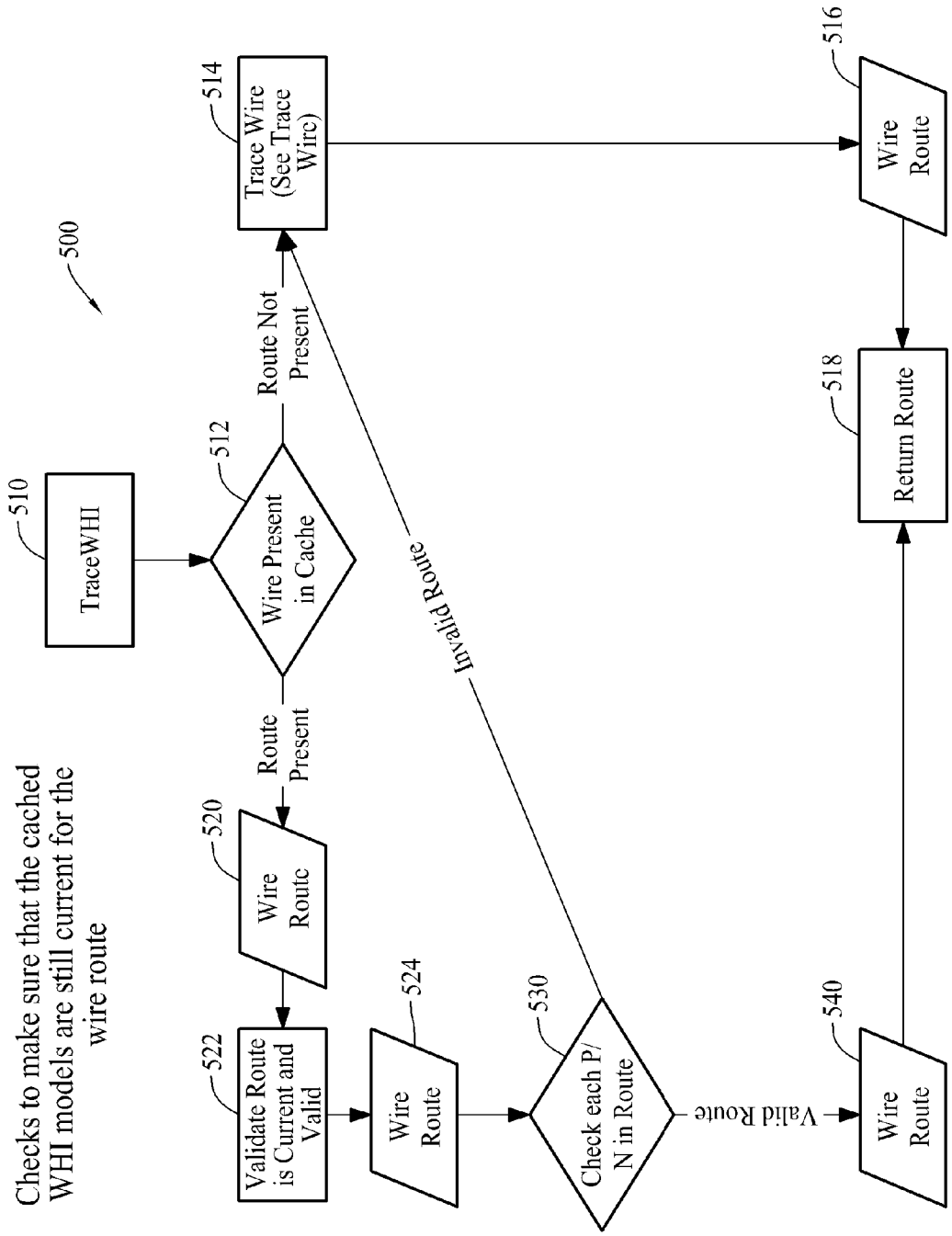
FIG. 5 is a flowchart of a process for determining if cached wire harness installation models are current for a particular wire route.

FIG. 5 is a flowchart 500 of one process 510 of the process 410 (shown in FIG. 4). Specifically, process 510 is utilized to determine if the cached wire harness installation models are current for a particular wire route. The TraceWHI process 510 begins by determining if the selected wire is present 512 in a master routing cache. If the wire route is not present 512, a Trace Wire process 514 is performed, as described with respect to FIG. 6, and a route 516 of the wire is determined, and the process ends 518. If the selected wire is present 512, the wire route 520 is accessed, and it is validated 522 to ensure the route is current, which results in an updated wire route 524. Each item in the route is checked 530, and if an invalid route exists, the trace wire process 514 is run. If each item, such as a logical wire descriptor, and route are valid, the wire route is considered to be verified 540, and the process ends.

Figure 6:
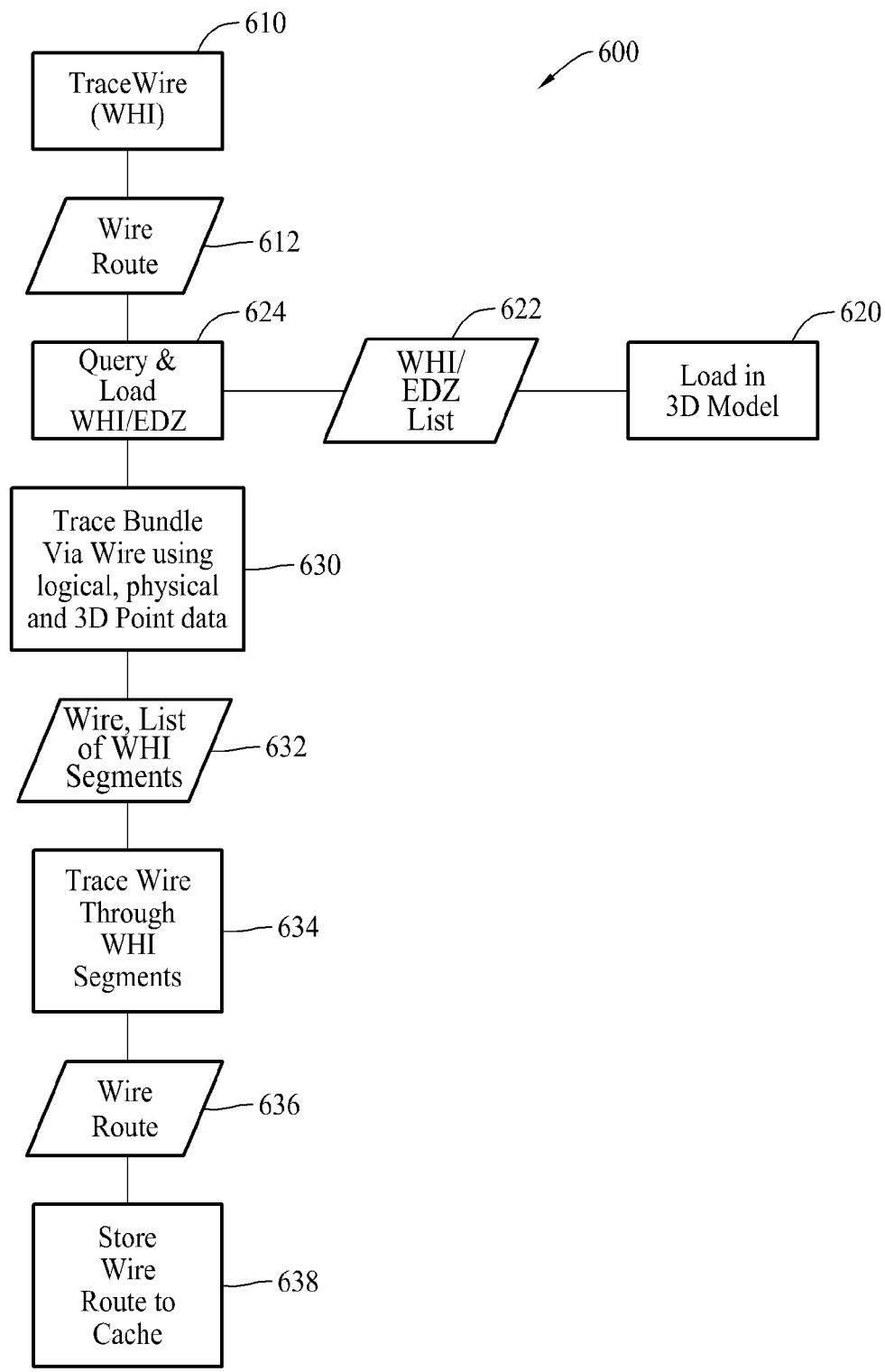
FIG. 6 is a flowchart of a wire tracing process.

FIG. 6 is a flowchart 600 of a TraceWire process 610. For a selected wire 612, a three-dimensional model 620 and/or one or more other models is loaded against the wire harness installation/electrical design zone list 622 as a query and load 624. A TraceBundle process 630 is performed for the selected wire using logical, physical, and three-dimensional point data, producing a list 632 of wire harness installation segments, which allows for the trace 634 of the wire through the wire harness installation segments, thereby defining a wire route 636 which can be stored 638 to a cache.

Figure 7:
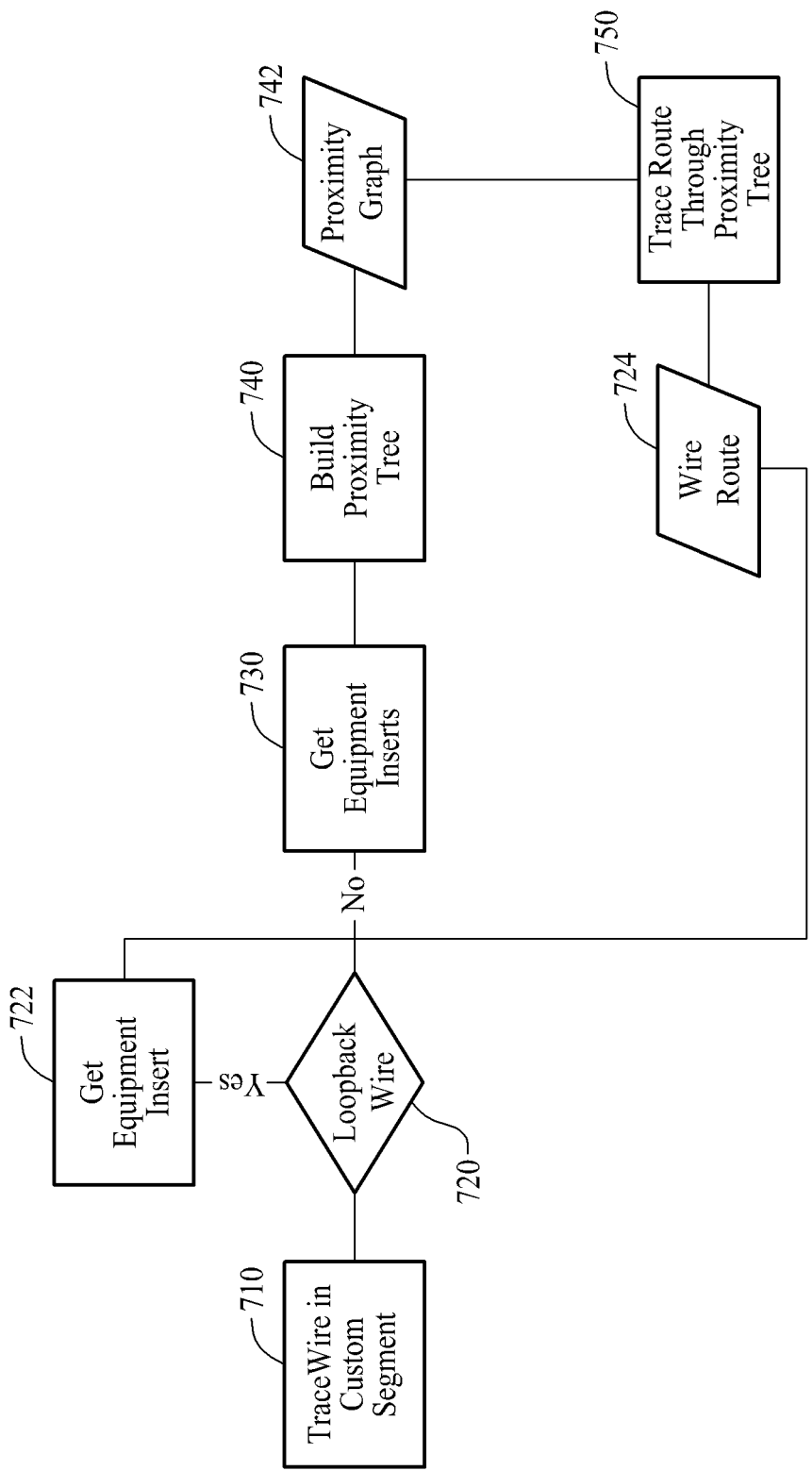
FIG. 7 is a flowchart illustrating tracing of a wire through wire harness installation segments.
Figure 8:
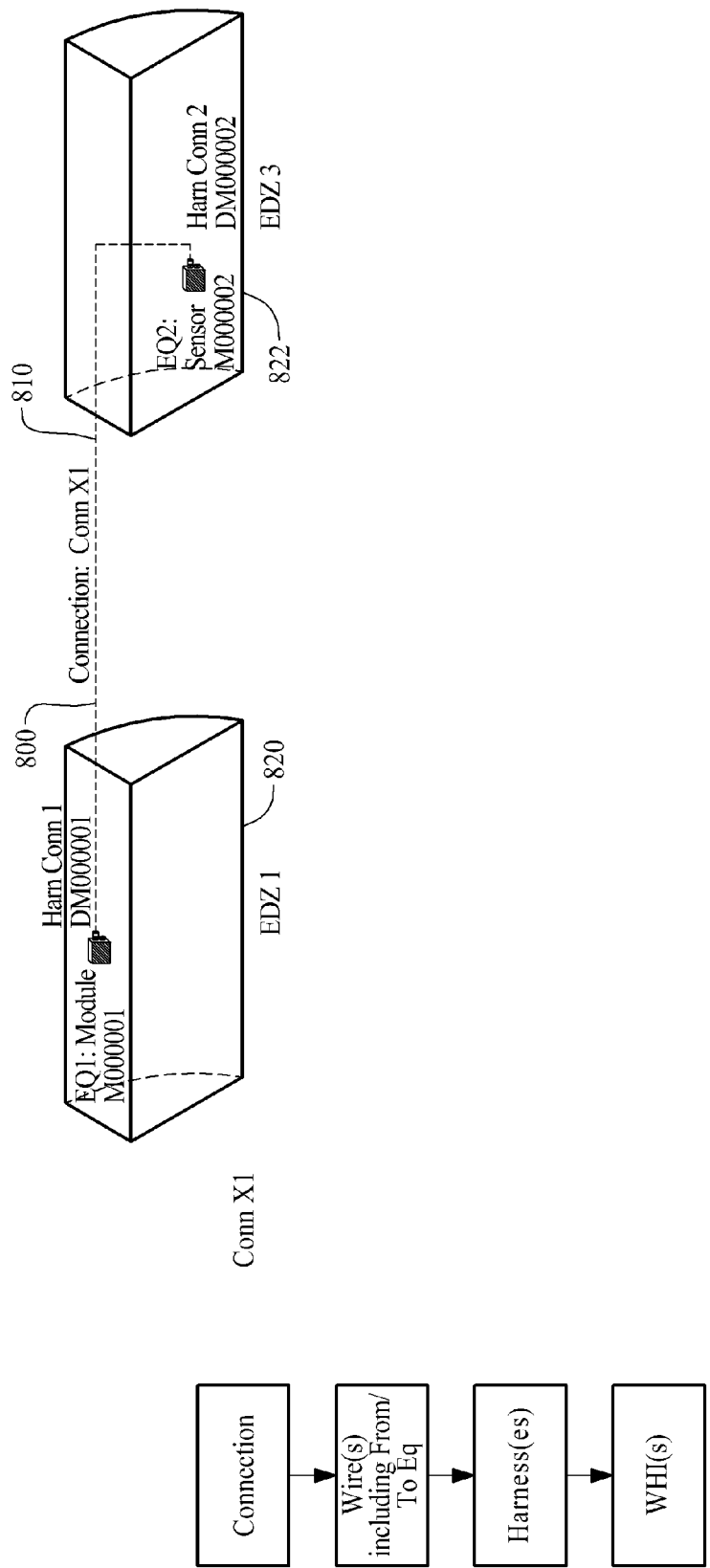
FIG. 8 illustrates a portion of connection trace process example regarding a connection between a module EQ1 and a sensor EQ2.

In FIG. 7, a flowchart 700 for the trace 634 of the wire through the wire harness installation segments is shown. In the TraceWire process 710 for a selected wire, it is determined 720 whether the wire is or is not a loopback wire. For a loopback wire, an equipment insert is retrieved 722 and the route 724 for the wire is generated. If the wire is not a loopback wire, an equipment insert is retrieved 730 and an algorithm 740 is run to determine proximities of elements and a proximity graph 742 which allows the trace route 750 through the proximity tree for generation of the wire route 724.

Figure 9:
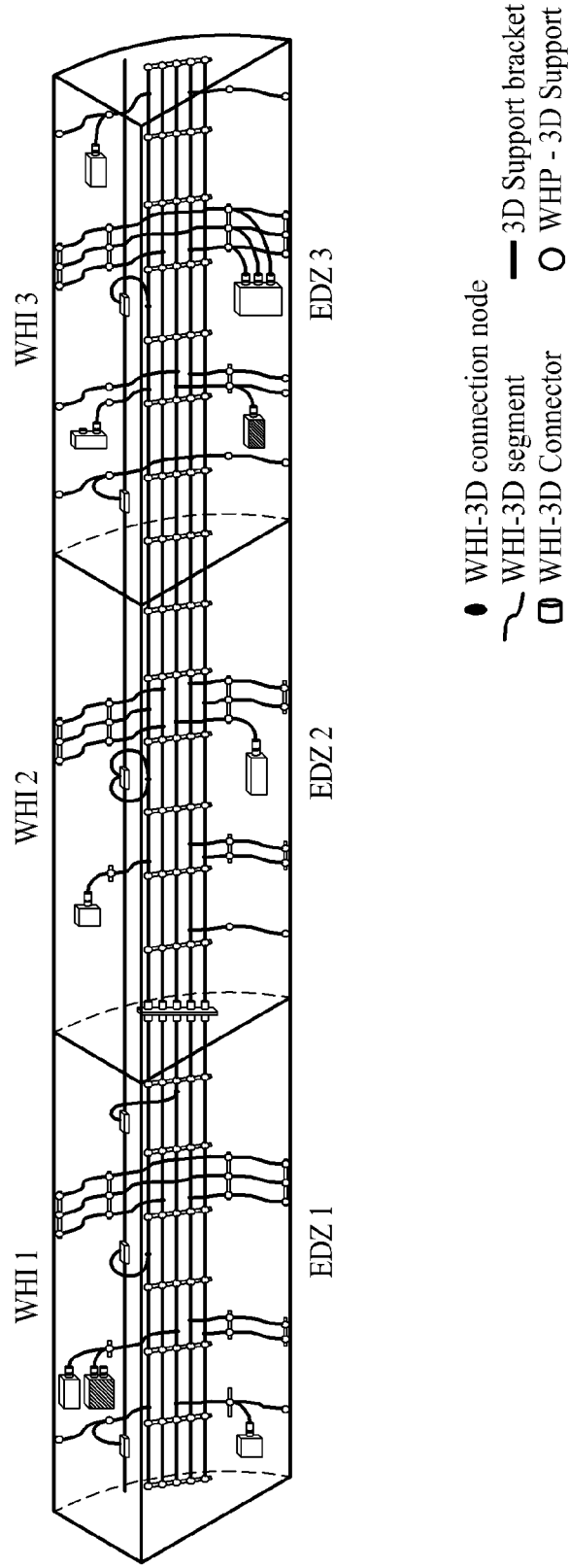
FIG. 9 further illustrates the connection trace process example of FIG. 8 including determination of applicable wire harness installations for applicable harness end items are determined and loading of applicable wire harness installation models.

FIGS. 8-12 provide an illustrative connection trace process example regarding a connection between a module EQ1 and a sensor EQ2. A line number 800 (line 7) and a connection 810 (Conn X1) between two electrical data zones (EDZ 1) 820 and (EDZ3) 822 are selected and applicable harness end items (HEIs) for the connection are determined (including W1 and W2). Turning to FIG. 9, the applicable wire harness installations for the applicable harness end items are determined and the applicable wire harness installation models (WHI 1, WHI 2, WHI 3) are loaded for the selected connection.

Figure 10:
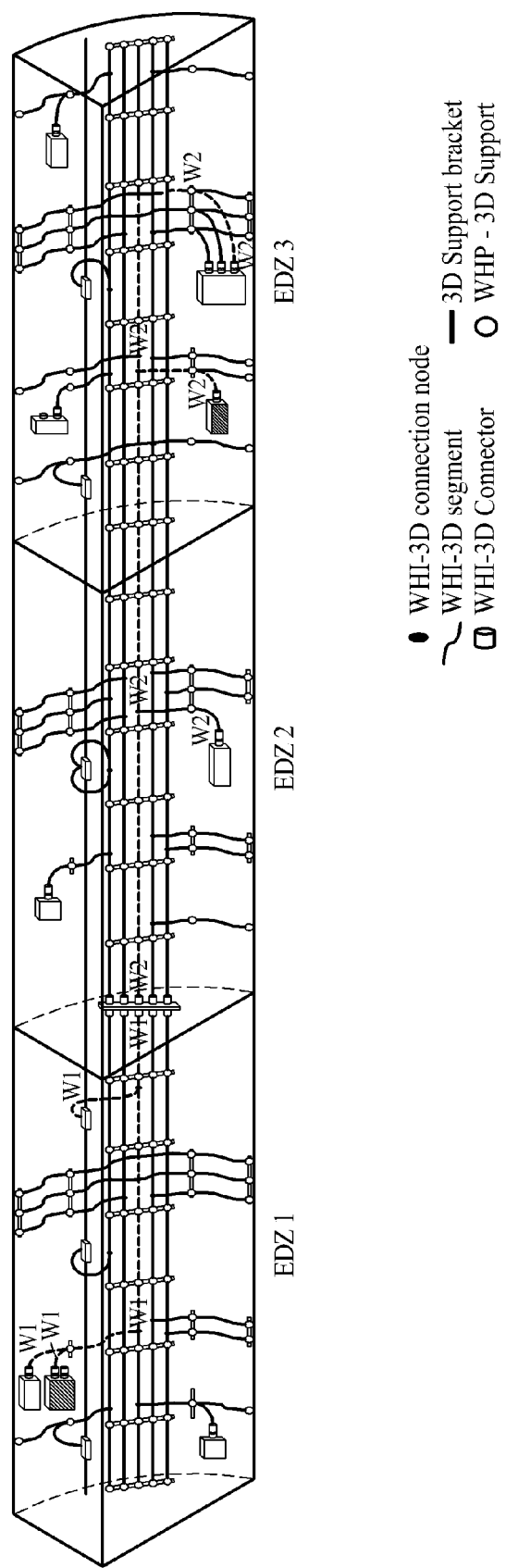
FIG. 10 further illustrates the connection trace process example of FIG. 8 including filtering of wire harness installations by harness.
Figure 11:
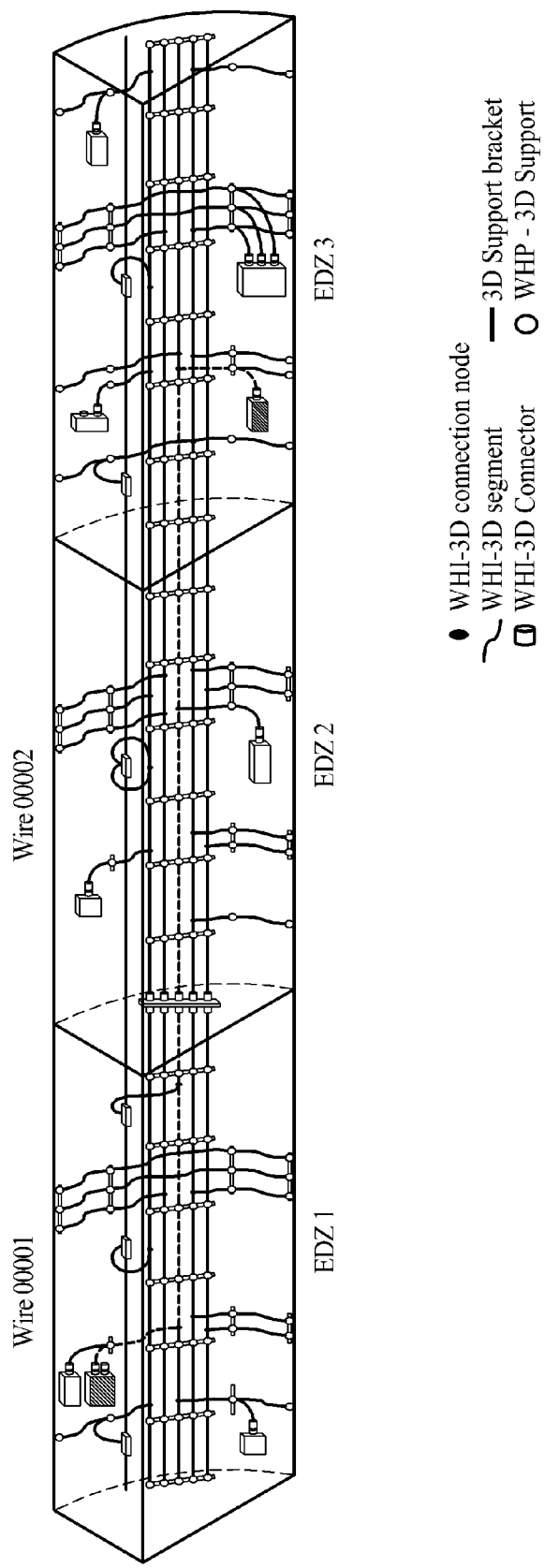
FIG. 11 further illustrates the connection trace process example of FIG. 8 including filtering of wire harness installations by connective equipment.
Figure 12:
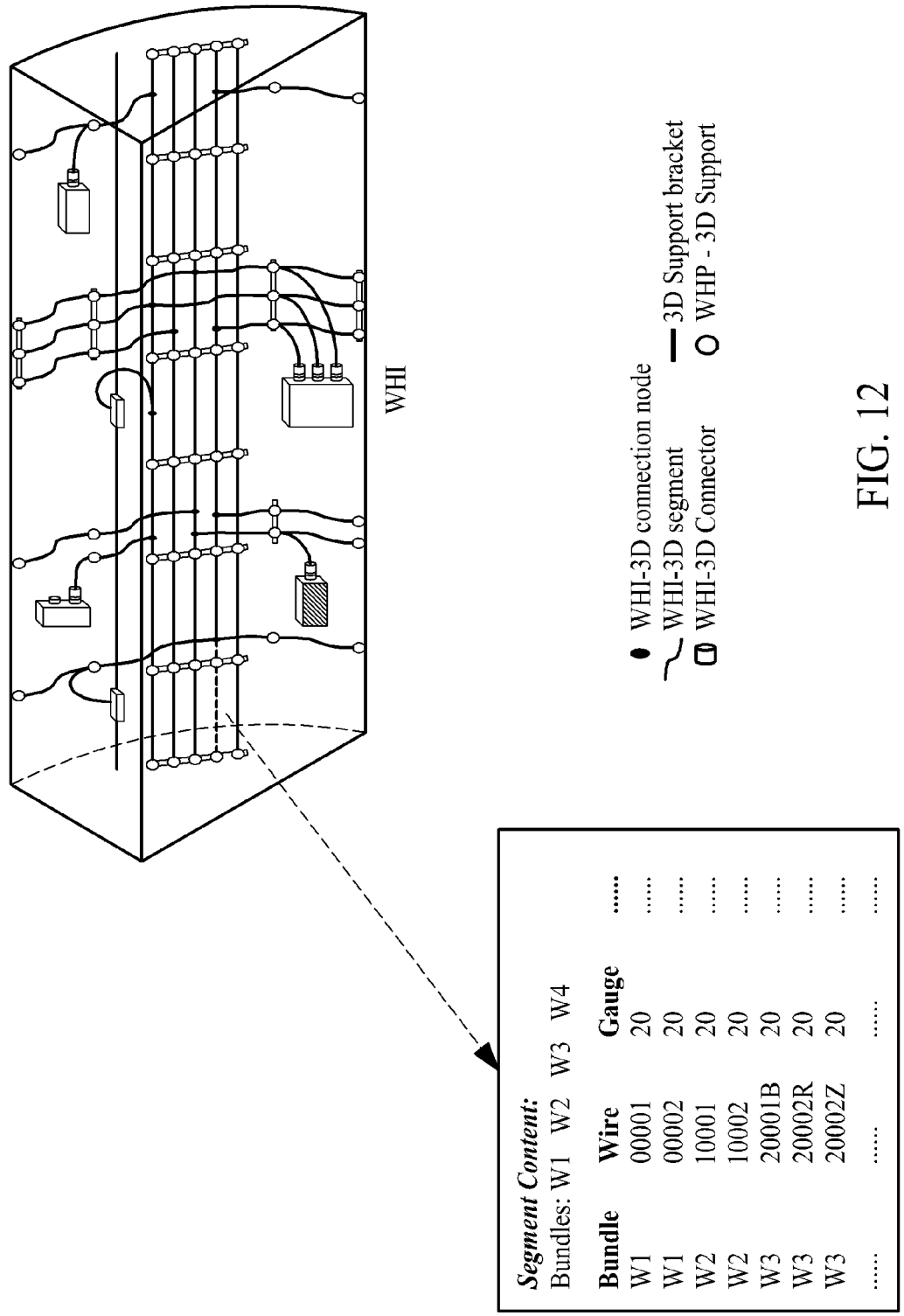
FIG. 12 illustrates a table of content with regard to a specific harness segment.

In FIG. 10, the wire harness installations are filtered by harnesses (W1, W2), and in FIG. 11, the wire harness installations are filtered by connective equipment which allows for the tracing of each wire segment in the connection between module EQ1 and sensor EQ2, the results of which are viewable by a user. FIG. 12 illustrates a table of content with regard to a specific segment.

Figure 13:
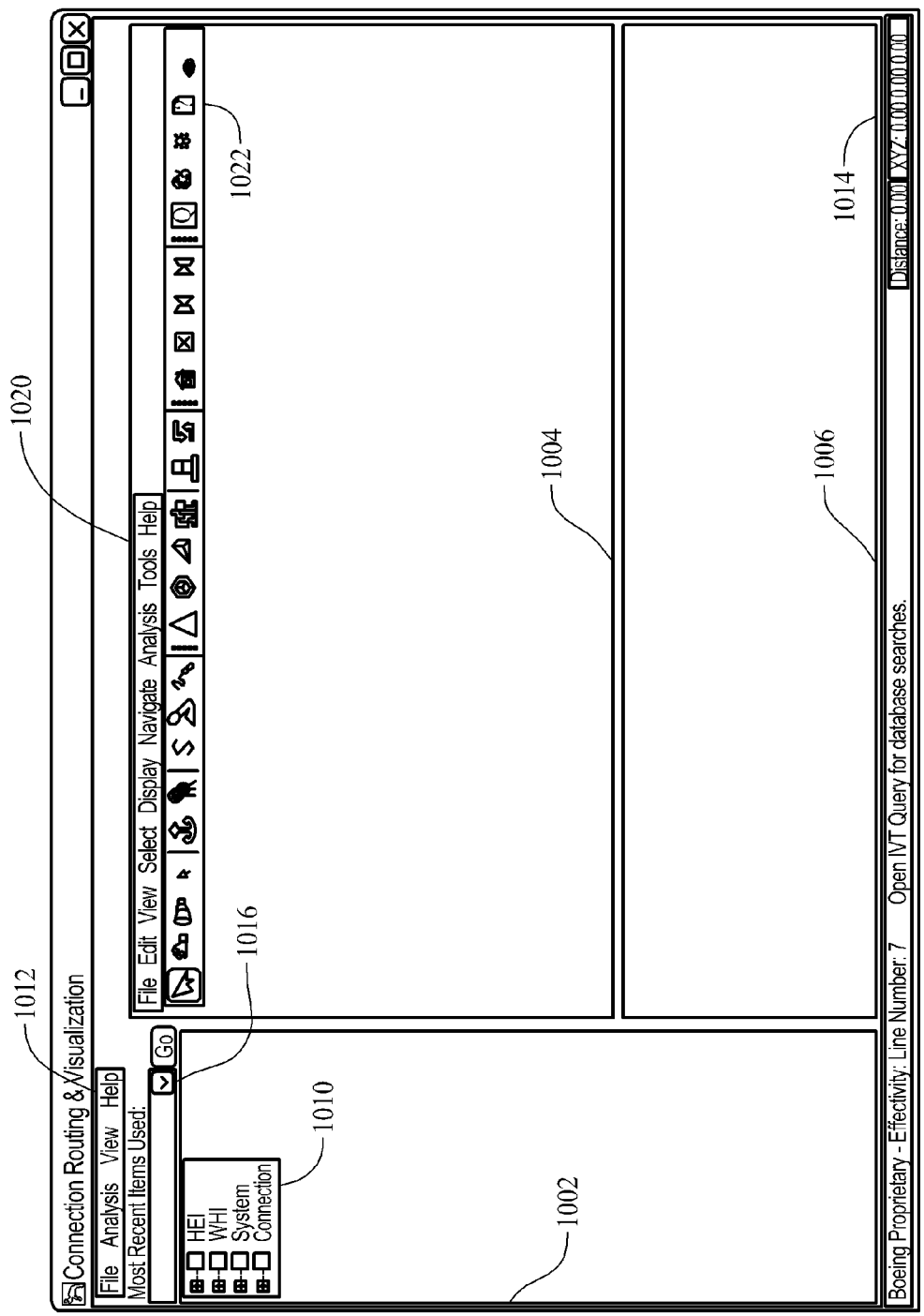
FIG. 13 is a user interface for a connection, routing, and visualization application.

From a user perspective, FIG. 13 is a connection routing and visualization user interface 1000 for the connection, routing, and visualization embodiments described above. The user interface 1000 is divided into three separate windows each window having a specific purpose. The windows include a navigation window 1002, a 3D physical data window 1004, and a logical data window 1006. User interface 1000 also includes a navigation tree 1010, menu items 1012, a status bar 1014, a most recent items used search 1016, integration visualization tool (IVT) menu items 1020, and IVT toolbars 1022.

As used herein, IVT refers to a three-dimensional visualization and representation tool, which enables translation and storage of native geometry, for example, from product lifecycle management solutions provided by Dassault Systems (under the trademarks CATIA, ENOVIA and DELMIA) in a lightweight format for design integration. IVT enables extensive search, filtering and interference management capabilities.

The process of loading data is begun by selecting one or more models in the navigation window 1002. Once the models have been selected, the other windows (3D physical data window 1004 and logical data window 1006) are loaded with their respective data. In the illustrated embodiment, the navigation window 1002 contains the following four navigation sub trees: Harness End Item (HEI), Wire Harness Installation (WHI), System, and Connection. Each sub tree can be expanded by double-clicking either the sub tree name or by selecting the plus sign next to the sub tree name. Each model tree is filtered, based on the user selected effectivity. The HEI is a dynamically generated tree-list of HEI part numbers from a functional integration operational data store (FIODS). The WHI is a dynamically generated tree-list of WHI part numbers from the integration visualization tool (IVT).

System is a dynamically generated list of connections from FIODS organized by 6-digit system numbers. The WHI and WHA nodes below the system tree allow the user to choose which three-dimensional wire harness model type (Installation or Assembly) to use to display the connection route. For example, if it is desired to view a particular connection route in the wire harness installation geometry, the user must select the WHI node below the system tree instead of the WHA node.

Connection is a dynamically generated list of connections from FIODS. Similar to the System tree, the WHI and WHA nodes below the connection tree allow the user to choose which three-dimensional wire harness model type (Installation or Assembly) to use to display the connection route.

Figure 14:
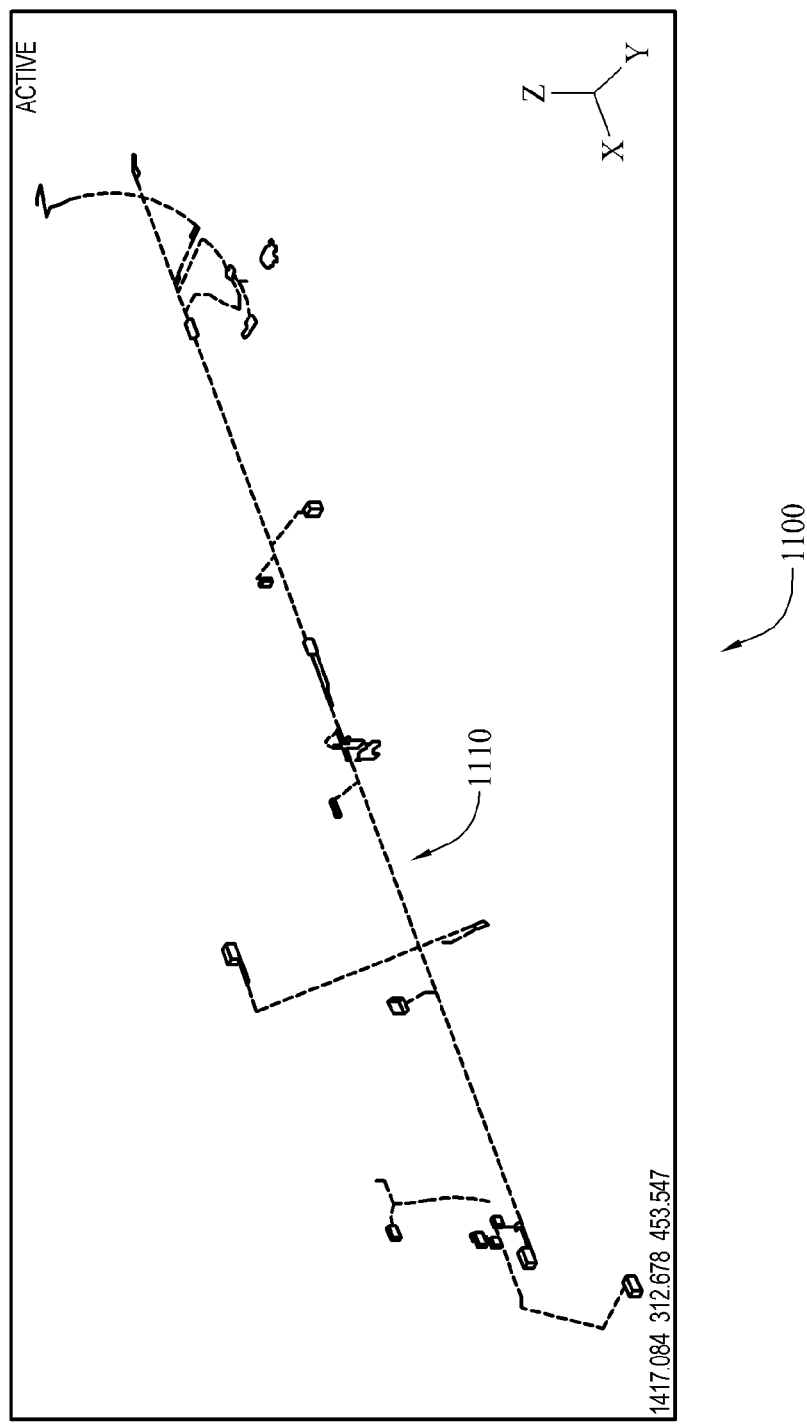
FIG. 14 illustrates an embodiment of a three-dimensional physical data window.

FIG. 14 is one embodiment of a 3D physical data window 1100. Three-dimensional geometric models 1110 are displayed in the 3D physical data window. The described embodiments utilize an embedded fully functional version of IVT. When a model is selected from the navigation window 1002, the system loads the associated three-dimensional model from IVT. An ability is also provided to manually query IVT to add or append three-dimensional contextual data (models not listed in the Navigation Window of CRV).

The logical data window 1006 is the space where logical data related to the selected model is displayed. This logical data is provided in a table format as shown in window 1200 of FIG. 15. In the case of a connection, the logical data window 1006 provides a list of wires that have been assigned to the selected connection in a logical wiring design information database. In the case of an HEI or WHI, the logical data window 1006 displays the wire content which routes through a selected three-dimensional wire harness segment.

With regard to menu items 1012, under the file menu, a user may elect to close model(s) which unloads all loaded models, change effectivity which selects a new line number, page setup which modifies the page properties for printing, print preview which previews the active window for printing, print for printing of the active window, and exit which exits the CRV application.

Under an analysis menu selection, user may elect to utilize a segment content viewer which displays the wire content in the selected three-dimensional wire harness segment or elect to utilize a trace wire selection that highlights the wire route in the three wire harness model.

A view menu selection allows a user to customize a logical view, specifically, by hiding, showing, and/or moving columns in the logical data window. The user may also select options which enable the modification of settings. A help menu allows a user to access the CRV online help web page in the default web browser, access a user guide document or display a version of the CRV tool.

The status bar 1014 includes, from left to right in the illustrated embodiment, a selection effectivity, selection information on the solid or model that has been selected, a selection distance between the last two points that have been selected, and a selection point which shows the XYZ coordinates of the selected point.

The most recent items used search provides a method to quickly navigate to a recently-viewed model. Rather than expand each node of the tree to get to a particular model, the user can select a model from the drop-down list, select the "Go" button and the tree will expand to that model.

Figure 16:
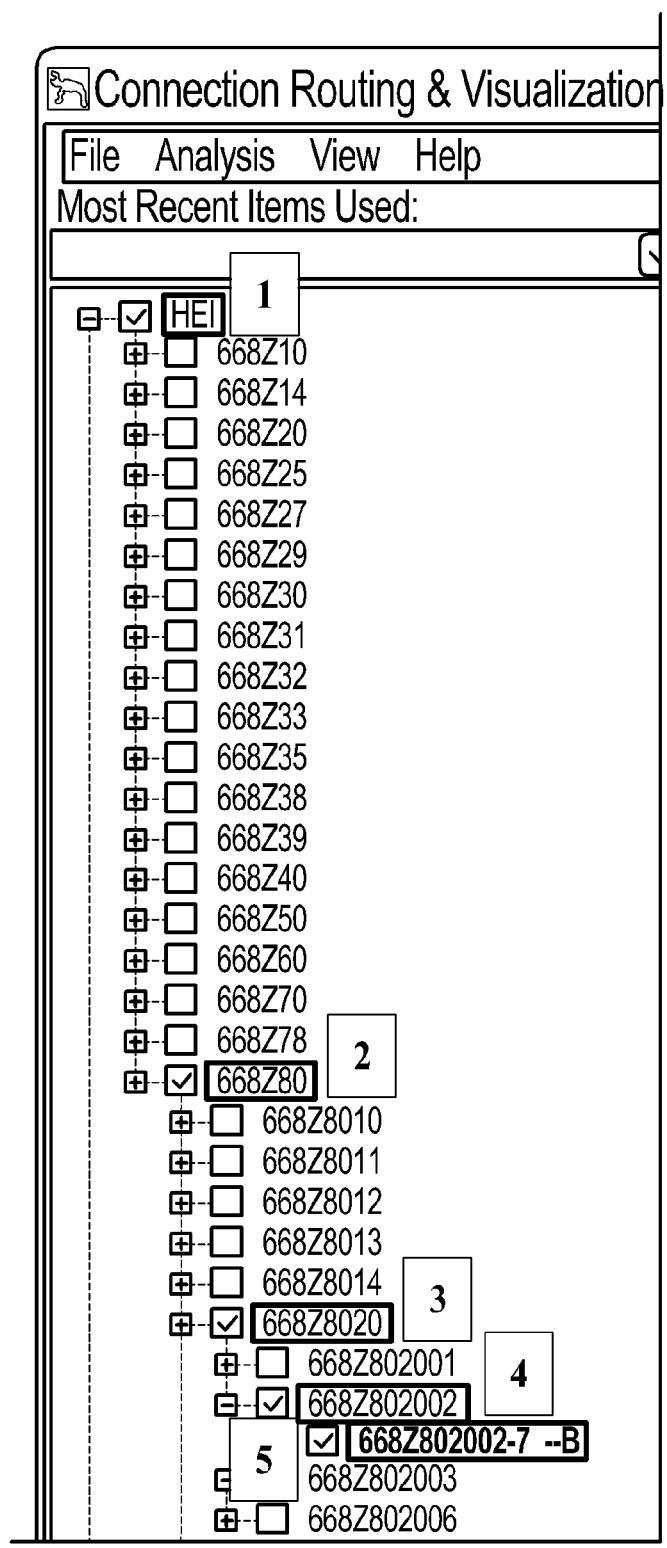
FIG. 16 illustrates user navigation to and selection of a desired harness end item model.
Figure 17:
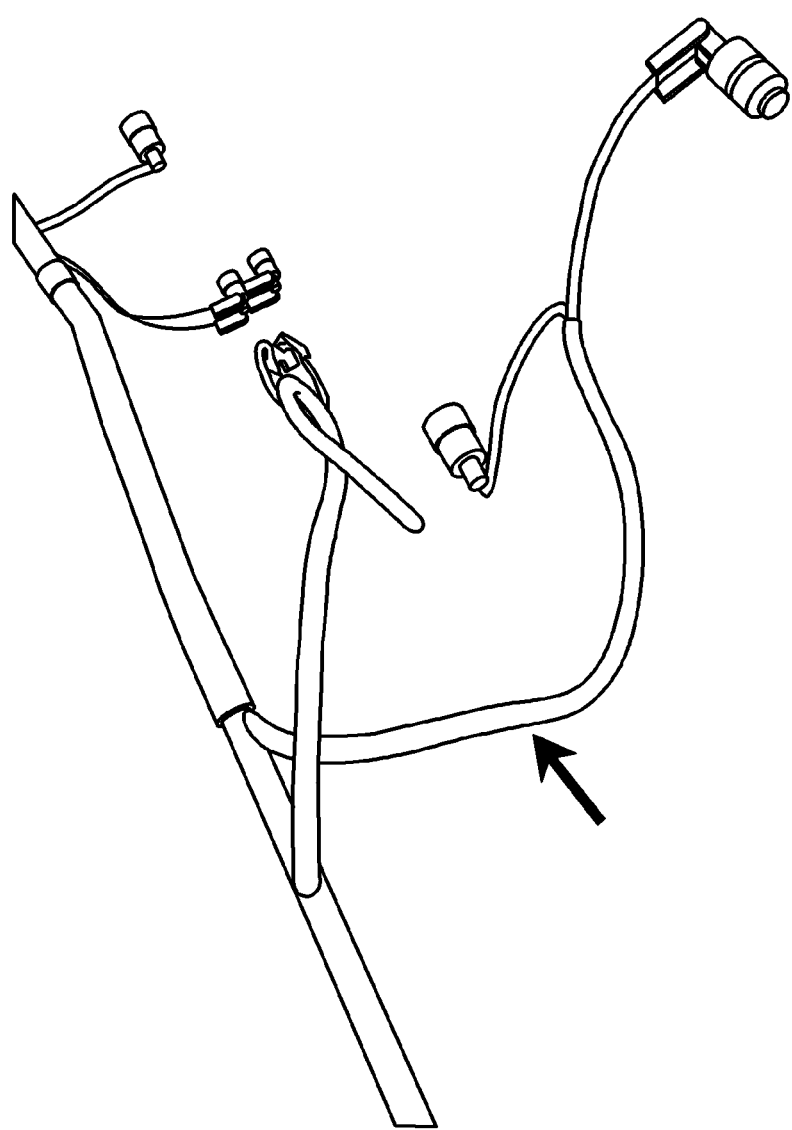
FIG. 17 illustrates user selection of a segment in the three-dimensional wire harness model.
Figure 18:
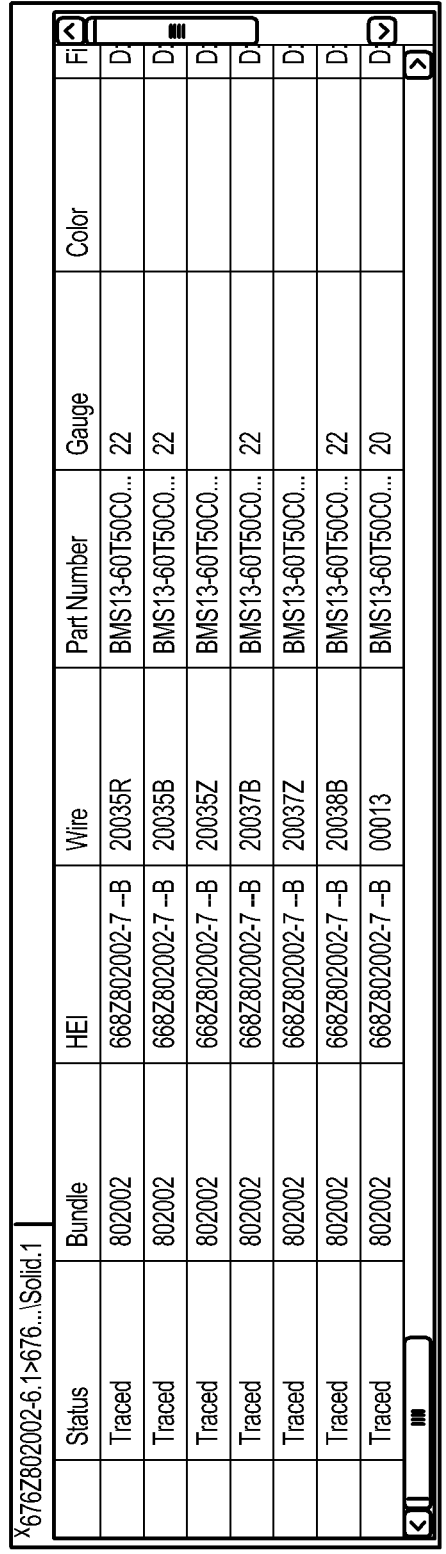
FIG. 18 illustrates that the resulting wire content is displayed in the logical data window.

The segment content viewer function provides an ability to view the wire content for a selected three-dimensional wire harness segment. The user is able to select a segment in either a WHA or WHI model and view the wires which route through the segment. Tracing wires within the WHA models represents a much simpler case, because all of the wires that need to be traced are contained within the single WHA model. As a result, the wires are traced during the user's session. Tracing wires within the WHI models is more complex. The WHIs contain many harnesses, and each harness may be routed through many WHI models. As a result, a master wire cache is queried which contains trace data for a given line number. FIGS. 16-18 illustrate.

In FIG. 16, the user navigates to the desired HEI model, and expands the tree until the user is able to select the checkbox next to the desired HEI model to load the model. FIG. 17 illustrates that once the associated 3D Wire Harness Model has been loaded into the 3D Physical Data window, the user can then select a segment in the 3D Wire Harness Model. In one embodiment, if the 3D Wire Harness Model has sleeves which prevent the selection of the desired segment, the user is able to hide the sleeves via the user interface so that the resulting wire content is displayed in the Logical Data window as shown in FIG. 18.

Figure 19:
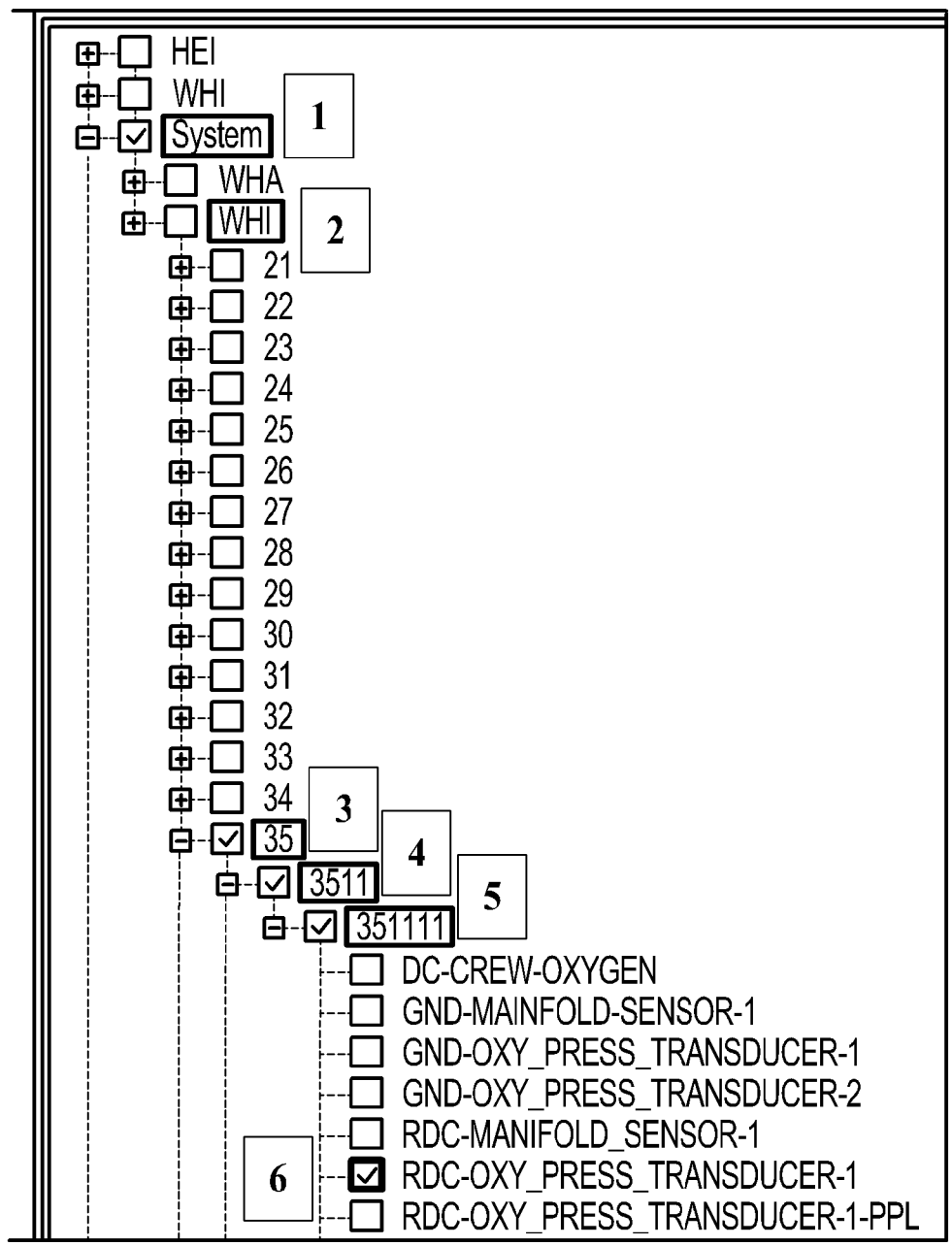
FIG. 19 illustrates user navigation to and selection of a desired connection.
Figure 21:
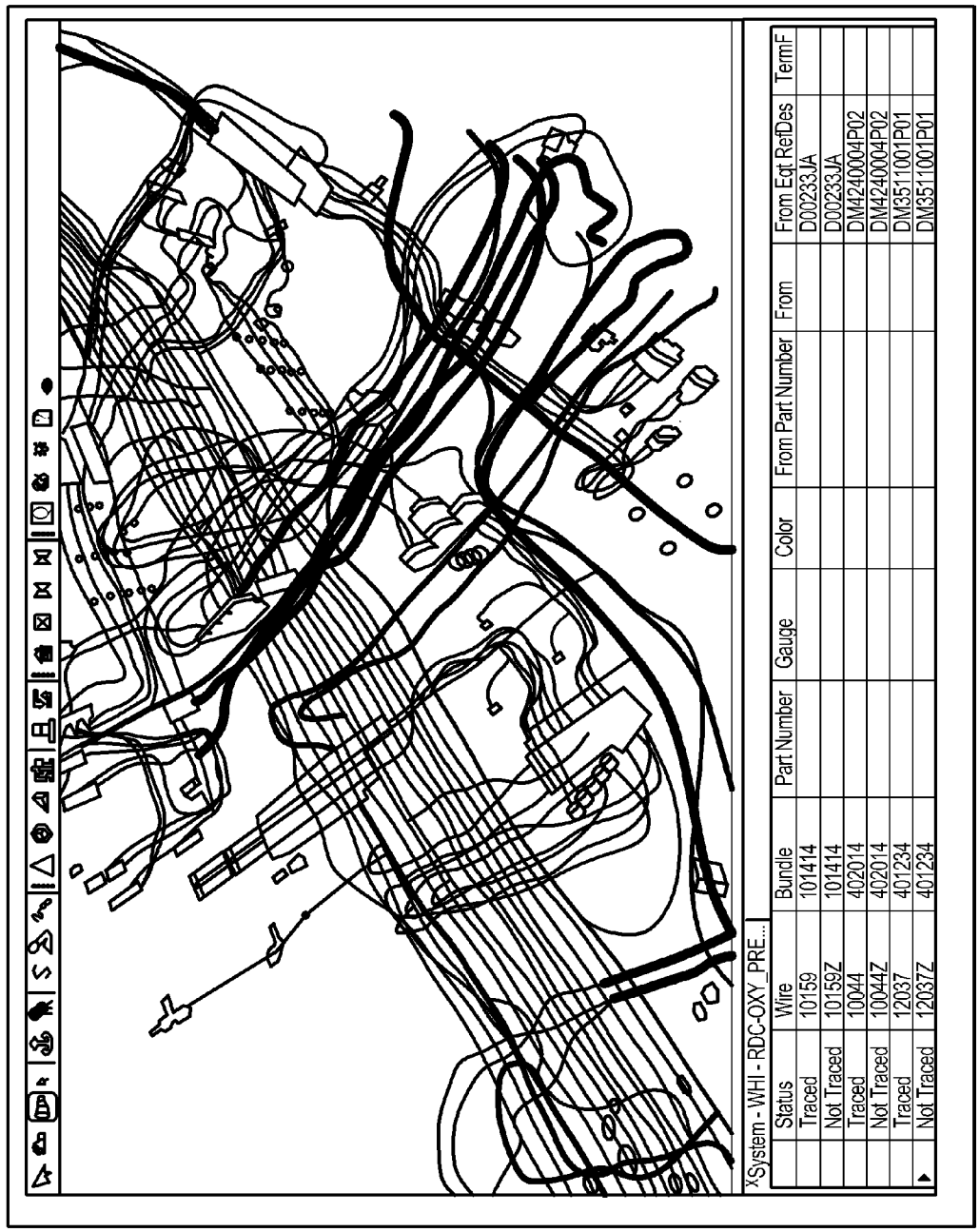
FIG. 21 illustrates that the resulting traced connection is displayed in the three-dimensional physical data window.

Referring to FIGS. 19-21, a connection represents a logical connection between equipment. A trace connection process provides the ability to view the list of wire segments that have been assigned to the connection, and also the ability to view a connection route in the three-dimensional airplane.

As shown in FIG. 19, the user navigates to the desired connection, expands the system tree and selects the checkbox next to the desired connection. Once the associated 3D Wire Harness Models and Connection data have been loaded into the 3D Physical Data window and Logical Data window, the user is provided with a selectable net column to sort the table data by net. The desired net rows are selected as shown in FIG. 20, and with the desired rows selected, the user is able to select "Analysis" and then "Trace Wire". If the 3D Wire Harness Models have sleeves which prevent the visualization of the traced wire route, the user is able to hide the sleeves via the user interface so that the resulting traced connection is displayed in the 3D Physical Data window as shown in FIG. 21. In embodiments, each wire or net is colored differently in both the 3D Physical Data window and the Logical Data window.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for creating a computerized visualization of a wiring topology, said method comprising:
  combining, using a process executed on a computer processing device, three-dimensional wire harness data, which includes wire harness assembly (WHA) models and wire harness installation (WHI) models with logical wire content for a harness end item (HEI), which includes schematics, to generate a graphical wire topology, wherein combining the three-dimensional wire harness data and the logical wire content comprises:
    loading a three-dimensional model containing a layout and a location of each wire of a plurality of wires within a platform, wherein the three-dimensional model includes the WHA model;
loading physical design data for each wire of the plurality of wires, wherein the physical design data includes the WHI model;
loading logical wired content for the HEI, including detailed specifications and a schematic of each wire of the plurality of wires;
bundling logical, physical, and three-dimensional point data for the selected wire;
producing a list of wire harness installation segments;
tracing the selected wire through the wire harness installation segments to define a wire route in the graphical wire topology for the selected wire;
determining, for the selected wire, whether the wire is or is not a loopback wire;
for a loopback wire,
  retrieving an equipment insert; and
  generating the route for the wire; and
for a non-loopback wire,
  retrieving an equipment insert;
  running an algorithm to build a proximity tree and a proximity graph which allows the trace route through the proximity tree for generation of the wire route; and
  storing the defined wire route to a cache; and
displaying, based on the combined three-dimensional wire harness data and logical wire content, the graphical wire topology, output from the process, including the defined wire route for the selected wire, within the three-dimensional model of the platform within which the wiring topology is contained, wherein the graphical wire topology displays a visualization of a wiring geographical spatial topology, a physical layout topology, and a logical connection topology to describe each wire of the plurality of wires in three-dimensions.

2. The method according to claim 1 further comprising selecting at least one of the three-dimensional wire harness data and the logical wire content from a user interface.

3. The method according to claim 2 further comprising verifying that the three-dimensional wire harness data is current for wire route selected from the user interface.

4. The method according to claim 1 wherein combining three-dimensional wire harness data with logical wire content comprises determining if a selected wire is present in a master routing file.

5. The method according to claim 1 further comprising:
selecting a line number and a connection between two data zones;
determining applicable harness end items for the connection;
determining the applicable wire harness installations for the applicable harness end items; and
loading the applicable wire harness installation models for the selected connection.

6. The method according to claim 5 further comprising:
filtering the wire harness installations by harnesses;
filtering the wire harness installations by connective equipment; and
tracing each wire segment in the connection.

7. The method according to claim 6 wherein filtering the wire harness installations further comprises displaying a three-dimensional image of each wire segment in the selected connection less the logical wire content.

8. The method according to claim 1 wherein combining three-dimensional wire harness data with logical wire content in a process executed on a computer processing device comprises:
selecting, via a navigation window, one or more wiring models; and
based on the selected models, loading three-dimensional physical data within a physical data window and loading logical data within a logical data window.

9. The method according to claim 1 further comprising retrieving three-dimensional wire harness data for the wire harness, wherein three-dimensional wire harness data includes a plurality of points defined in three-dimensional space along the wire harness at an end point or a clamp of the wire harness.

10. The method according to claim 1 wherein displaying a graphical wire topology further comprises displaying a three-dimensional graphical representation and a three-dimensional textual representation of each wire of the plurality of wires.

11. One or more non-transitory computer-readable storage media having computer-executable instructions embodied thereon, wherein when executed by at least one processor, the computer-executable instructions cause the at least one processor to:
select a connection between modules in a platform;
determine applicable logical wire content for the selected connection, the logical wire content including detailed specifications and a schematic of each wire of a plurality of wires within the platform;
load a three-dimensional model containing three-dimensional wire harness data that corresponds to the logical wire content for each wire of the plurality of wires, the three-dimensional wire harness data including a layout and a location of each wire of the plurality of wires, wherein the three-dimensional wire harness data includes wire harness assembly (WHA) models and physical design data including wire harness installation (WHI) models;
bundle the logical wire content, physical data, and the three-dimensional wire harness data for the selected connection;
filter the three-dimensional wire harness data by harness and by connective equipment to identify a plurality of wire segments for the selected connection;
determine, for the selected connection, whether the connection is or is not a loopback wire;
retrieve an equipment insert and generate the route for the connection for a loopback wire;
retrieve an equipment insert and rung an algorithm to build a proximity tree and a proximity graph which allows the trace route through the proximity tree for generation of the wire route for a non-loopback wire;
trace each wire segment in the selected connection to define a wire route for the selected connection; and
provide the results to a user interface, wherein the user interface is configured to display, based on the combined three-dimensional wire harness data and logical wire content, a graphical wire topology within a three dimensional model of the platform within which the wiring topology is contained, wherein the graphical wire topology displays a visualization of wiring geographical spatial topology, a physical layout topology, and a logical connection topology to describe each wire of the plurality of wires in three-dimensions.

12. One or more non-transitory computer-readable storage media having computer-executable instructions embodied thereon according to claim 11, wherein to select a connection between modules in a platform, the computer-executable instructions cause the at least one processor to receive a user selection of at least one of a three-dimensional wire harness data and the logical wire content via a user interface.

13. One or more non-transitory computer-readable storage media having computer-executable instructions embodied thereon according to claim 11, wherein to determine applicable logical wire content for the selected connection, the computer-executable instructions cause the at least one processor to verify that the three-dimensional wire harness data is current for wire route selected from the user interface.

14. One or more non-transitory computer-readable storage media having computer-executable instructions embodied thereon according to claim 11, wherein to determine applicable logical wire content for the selected connection, the computer-executable instructions cause the at least one processor to determine if a selected wire is present in a master routing file.

15. One or more non-transitory computer-readable storage media having computer-executable instructions embodied thereon according to claim 11, wherein to filter the three-dimensional wire harness data by harness and by connective equipment, the computer-executable instructions cause the at least one processor to produce a list of wire harness installation segments.

16. One or more non-transitory computer-readable storage media having computer-executable instructions embodied thereon according to claim 11 wherein to:
select a connection between modules in a platform, the computer-executable instructions cause the at least one processor to receive a user selection of a line number and a connection between two data zones;
determine applicable logical wire content for the selected connection, the computer-executable instructions cause the at least one processor to determine applicable harness end items for the connection and determine the applicable wire harness installations for the applicable harness end items; and
load the applicable three-dimensional wire harness data for the logical wire content, the computer-executable instructions cause the at least one processor to load the applicable wire harness installation models for the selected connection.

17. A system for routing and visualization of a wiring topology, said system comprising:
a processing device;
a memory communicatively coupled to said processing device; and
a user interface communicatively coupled to said processing device, said processing device programmed to:
receive, via said user interface, a user selection of a wire of a plurality of wires within a wiring topology for a platform;
load, from said memory, logical wire content for the selected wire, including detailed specifications and a schematic of each wire of the plurality of wires;
load, from said memory, a three-dimensional model containing three-dimensional wire harness data, including a layout and a location of each wire of the plurality of wires including wire harness assembly (WHA) models;
load, from said memory, physical design data including a wire harness installation (WHI) list;
bundle logical, physical, and three-dimensional point data from the logical wire content, the three-dimensional model, and the wire harness installation list for the selected wire;
produce a list of wire harness installation segments;
trace the selected wire through the wire harness installation segments to define a wire route in the wiring topology for the platform for the selected wire;
determine, for the selected wire, whether the wire is or is not a loopback wire;
for a loopback wire,
retrieve an equipment insert; and
generate the route for the wire; and
for a non-loopback wire,
retrieve an equipment insert;
run an algorithm to build a proximity tree and a proximity graph which allows the trace route through the proximity tree for generation of the wire route; and
provide, based on the bundled data, an output via said user interface predicting three-dimensional routing of the selected wire through a platform, the output including a visualization of a wiring geographical spatial topology, a physical layout topology, and a logical connection topology to describe each wire of the plurality of wires in three-dimensions.

18. A system according to claim 17, said system further programmed to determine if the selected wire is present in a master routing file.

* * * * *